(12) United States Patent
Price et al.

(10) Patent No.: US 11,300,386 B2
(45) Date of Patent: Apr. 12, 2022

(54) BALLISTIC MATERIALS INCORPORATING SPUNLACED NONWOVENS

(71) Applicant: Dupont Safety & Construction, Inc., Wilmington, DE (US)

(72) Inventors: Allen L. Price, Rising Sun, MD (US); David Brahms, South Portland, ME (US); Scott Janco, Portland, ME (US); Courtney Musciano, Portland, ME (US); Robert Gravel, Greene, ME (US); Eric A. Barter, Winthrop, ME (US); Matt Langley, Manchester, ME (US); James Stahl, Portland, ME (US); Vincent Gallacher, Falmouth, ME (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 423 days.

(21) Appl. No.: 14/985,897

(22) Filed: Dec. 31, 2015

(65) Prior Publication Data
US 2017/0191803 A1 Jul. 6, 2017

(51) Int. Cl.
*F41H 5/04* (2006.01)
*B32B 5/02* (2006.01)
*B32B 5/06* (2006.01)
*B32B 5/26* (2006.01)
(Continued)

(52) U.S. Cl.
CPC ............ *F41H 5/0485* (2013.01); *B32B 5/022* (2013.01); *B32B 5/024* (2013.01); *B32B 5/06* (2013.01); *B32B 5/08* (2013.01); *B32B 5/26* (2013.01); *D04H 1/498* (2013.01); *B32B 2250/20* (2013.01); *B32B 2255/02* (2013.01); *B32B 2262/0253* (2013.01); *B32B 2262/0261* (2013.01); *B32B 2262/0269* (2013.01); *B32B 2262/0276* (2013.01); *B32B 2262/08* (2013.01); *B32B 2262/106* (2013.01); *B32B 2262/14* (2013.01); *B32B 2307/50* (2013.01); *B32B 2307/714* (2013.01); *B32B 2307/718* (2013.01);
(Continued)

(58) Field of Classification Search
CPC ....................................................... F41H 5/04
See application file for complete search history.

(56) References Cited

U.S. PATENT DOCUMENTS

| | | | |
|---|---|---|---|
| 2,862,251 | A | 12/1958 | Kalwaites |
| 3,829,939 | A | 8/1974 | Dilo |
| 4,522,871 | A | 6/1985 | Armellino, Jr. et al. |

(Continued)

FOREIGN PATENT DOCUMENTS

| | | |
|---|---|---|
| EP | 1579167 | 12/2004 |
| GB | 2090725 B | 2/1985 |

(Continued)

OTHER PUBLICATIONS

Department of Defense Test Method Standard, $V_{50}$ Ballistic Test for Armor, MIL-STD-662F, Dec. 18, 1997.
(Continued)

*Primary Examiner* — Andrew T Piziali

(57) ABSTRACT

A ballistic material is made from spunlace nonwoven fibers mechanically entangled into a woven ballistic fabric. The spunlace nonwoven may comprise low denier fibers providing for a highly dense ballistic product.

6 Claims, 3 Drawing Sheets

(51) Int. Cl.
  *B32B 5/08* (2006.01)
  *D04H 1/498* (2012.01)
(52) U.S. Cl.
  CPC ....... *B32B 2307/72* (2013.01); *B32B 2307/73* (2013.01); *B32B 2571/02* (2013.01)

(56) References Cited

U.S. PATENT DOCUMENTS

| | | | | |
|---|---|---|---|---|
| 4,892,780 A | * | 1/1990 | Cochran | B32B 5/06 |
| | | | | 442/242 |
| 5,098,777 A | * | 3/1992 | Koli | B32B 5/26 |
| | | | | 442/341 |
| 5,276,085 A | * | 1/1994 | Kasowski | C08G 69/32 |
| | | | | 524/606 |
| 5,323,523 A | | 6/1994 | Lawton et al. | |
| 5,368,920 A | | 11/1994 | Schortmann | |
| 5,373,792 A | * | 12/1994 | Pileggi | B61D 17/04 |
| | | | | 105/406.1 |
| 5,388,320 A | | 2/1995 | Smith et al. | |
| 5,440,965 A | | 8/1995 | Cordova et al. | |
| 5,531,649 A | * | 7/1996 | Osako | F16G 1/28 |
| | | | | 474/205 |
| 5,569,528 A | | 10/1996 | Van der Loo et al. | |
| 5,660,913 A | | 8/1997 | Coppage, Jr. | |
| 5,783,039 A | * | 7/1998 | Murayama | D04H 1/60 |
| | | | | 162/146 |
| 5,796,028 A | | 8/1998 | Field et al. | |
| 5,958,804 A | | 9/1999 | Brown, Jr. et al. | |
| 5,989,375 A | | 11/1999 | Bortz | |
| 6,026,509 A | | 2/2000 | Bachner, Jr. | |
| 6,248,676 B1 | | 6/2001 | Dischler | |
| 6,266,819 B1 | | 7/2001 | Bachner, Jr. | |
| 6,268,301 B1 | | 7/2001 | Dalman et al. | |
| 6,276,255 B1 | | 8/2001 | Field et al. | |
| 6,405,417 B1 | | 6/2002 | Sheehan et al. | |
| 7,101,818 B2 | | 9/2006 | Price et al. | |
| 7,150,046 B2 | | 12/2006 | Bottger et al. | |
| 7,340,779 B2 | | 3/2008 | Chiou | |
| 7,406,755 B2 | | 8/2008 | Putnam et al. | |
| 7,631,405 B2 | | 12/2009 | Ritter et al. | |
| 7,820,565 B2 | | 10/2010 | van Heerden et al. | |
| 7,862,690 B2 | | 1/2011 | Schmidt et al. | |
| 8,015,617 B1 | | 9/2011 | Carbajal et al. | |
| 8,080,486 B1 | | 12/2011 | Bhatnagar et al. | |
| 2003/0008584 A1 | | 1/2003 | Thomas | |
| 2003/0022583 A1 | | 1/2003 | Thomas et al. | |
| 2004/0101889 A1 | | 5/2004 | Letsinger et al. | |
| 2004/0112206 A1 | | 6/2004 | Ramkumar | |
| 2006/0078929 A1 | | 4/2006 | Bickel et al. | |
| 2008/0207461 A1 | | 8/2008 | Ermantraut et al. | |
| 2009/0325812 A1 | | 12/2009 | Mirkin et al. | |
| 2010/0113301 A1 | | 5/2010 | Remacle et al. | |
| 2011/0183562 A1 | | 7/2011 | Carter et al. | |
| 2011/0312238 A1 | | 12/2011 | Bader et al. | |
| 2012/0128947 A1 | * | 5/2012 | Bohringer | F41H 1/02 |
| | | | | 428/198 |
| 2012/0183720 A1 | * | 7/2012 | Wang | F41H 5/0485 |
| | | | | 428/68 |
| 2013/0273343 A1 | | 10/2013 | Dolan et al. | |
| 2014/0065907 A1 | | 3/2014 | Oktem et al. | |
| 2014/0124085 A1 | | 5/2014 | Shahkarami | |
| 2014/0272267 A1 | | 9/2014 | Grunden et al. | |

FOREIGN PATENT DOCUMENTS

| | | |
|---|---|---|
| JP | 01-272854 | 10/1989 |
| WO | WO 93/20271 | 10/1993 |
| WO | WO 2011/038510 | 4/2011 |

OTHER PUBLICATIONS

National Institute of Justice, Ballistic Resistance of Personal Body Armor, NIJ Standard-0101.04, Jun. 2001.
Kevlar Aramid Fiber Technical Guide, Jul. 2017, DuPont, pp. 1-24.
Declaration of David F. Erb, Jr., submitted in European Patent Application No. 03 816 943.
European Search report for corresponding app. No. 16882283.1 dated May 28, 2019.

* cited by examiner

BALLISTIC MATERIALS INCORPORATING SPUNLACED NONWOVENS

FIELD OF THE INVENTION

The invention is in the field of ballistic materials. Specifically, the invention is directed to a ballistic material made from ballistic grade woven fabric layer(s) and hydro-entangled nonwoven fibers entangled with the woven layer(s) to form improved core matrix component layers for ballistic vests, vehicular armor, structural armor and the like.

BACKGROUND OF THE INVENTION

U.S. Pat. Nos. 7,101,818 and 7,631,405, which are incorporated by reference in their entirety, describe ballistic materials and methods in which woven ballistic layer(s) are reinforced with fibers mechanically entangled in the interstices of the woven layer(s) to form a consolidated material. The "z-directional reinforcement" improves ballistic performance compared to multiple plies of the woven ballistic fabric stitched, thermally bonded, or mechanically bonded together by other means. The component parts of a ballistic construction made according to this method are referred to as "Core Matrix®" materials.

Conventionally, nonwoven fibers used to make Core Matrix® materials are prepared by carding prior to processing in a needlepunch loom. Using this technique to obtain the nonwoven component subjects the fibers to damage, and limits the fineness of denier that can be employed. Moreover, the nonwoven web/batting according to the existing methods cannot be pre-treated for water, oil, or chemical repellency.

There continues to be a need for Core-Matrix®-type ballistic materials with improved properties, particularly as relates to the properties of the nonwoven component, increased "push through" or entanglement of the nonwoven into the woven fabric, higher density and better ballistic performance.

SUMMARY OF THE INVENTION

In one aspect, the invention is a ballistic material, comprising: a first woven ballistic fabric having a fiber denier in a range of 50 d to 5000 d; and a hydroentangled nonwoven fiber component having a denier lower than the fiber denier of the first woven ballistic fabric; wherein the hydroentangled nonwoven component is mechanically entangled with the woven ballistic fabric to form a consolidated monolithic material. In embodiments, the hydroentangled nonwoven is hydroentangled prior to mechanical entanglement with the woven layer. In embodiments, the denier of the hydroentangled nonwoven is 0.5 d to 2.5 d, and in other embodiments, 0.5 d to 2.0 d.

In another aspect, the invention is a method of making a ballistic material which allows lower denier nonwoven fiber to be incorporated into a Core Matrix® ballistic fabric, resulting, in some cases, in improved performance; and in other cases allowing for alternative ballistic material solutions. In this aspect, the invention comprises positioning a first woven ballistic fabric layer having a fiber denier in a range of 50 d to 5000 d next to a hydroentangled nonwoven fiber layer, said nonwoven fiber layer having a denier lower than the fiber denier of the first woven ballistic fabric, and mechanically entangling the hydroentangled nonwoven fiber layer into the woven ballistic fabric layer to form a consolidated ballistic material. In embodiments, the hydroentangled layer is a material having a denier lower than 3.5 denier, for example (and not by way of limitation) a denier of 0.5 to 2.5 d, or 0.5 to 2.0 d, referred to as "spunlace".

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

Figure 1:
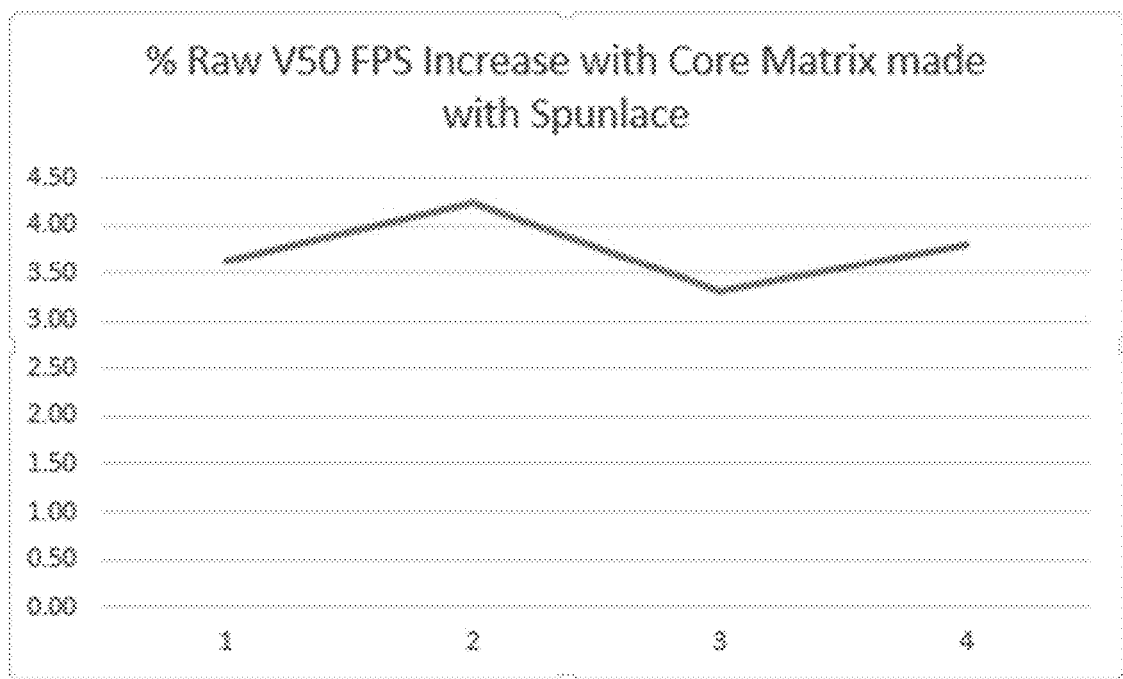
FIG. 1 shows plotted V-50 performance data of sample ballistic fabrics according to embodiments of the invention compared to the prior art.

"Denier" and the abbreviation "d" refers to a measure of linear density of yarn, specifically the weight in grams of 9000 meters of yarn.

"V-50" is a standard test of ballistic performance and refers to the velocity at which 50 percent of rounds fired at a ballistic target pass through the target. Thus, higher V-50 indicates better ballistic performance. V-50 data provided herein were obtained according to Standard NIJ 0101.06 in effect on the filing date of this application. "Normalized V-50", as used herein, means measured V-50 divided by areal weight.

"Spunlace", as used herein, refers to a webbing of hydroentangled fibers. In the hydroentanglement process, high energy jets of water are applied to fibers positioned against a foraminous backing member to form a webbing which can then be removed from the backing member in sheet(s). U.S. Pat. No. 2,862,251 describes what has come to be known as spunlace, and is incorporated by reference herein for that purpose.

A ballistic material according to the invention includes a first woven ballistic layer having a denier between about 50 d and 5000 d. In embodiments, the first woven ballistic layer comprises woven yarns of ballistic grade fibers have a tenacity of at least 15 grams per denier (13.5 g/decitex) and a tensile modulus of at least 400 grams per denier (360 g/decitex). Such yarns may be selected from, without limitation, ballistic grade poly(amide), para-aramid, ultra-high molecular weight polyethylene ("UHMWPE") fibers, polyester, and poly(phenylene-2,6-benzobisoxazole) ("PBO") fibers. In embodiments, woven fabrics of KEVLAR or TWARON brand para-aramid fibers were used.

A plurality of woven ballistic layers may be stacked prior to mechanically entangling with the spunlace nonwoven fiber. From 1 to about 50 woven layers may be stacked, in embodiments up to about 10 woven layers may be stacked prior to mechanical entanglement with the nonwoven. In embodiments, mechanical entanglement is done by needlepunching, substantially as described in the aforesaid U.S. Pat. Nos. 7,101,818 and 7,631,405. In other embodiments, water jets may be used to integrate the nonwoven fibers into the woven fabric by hydroentanglement.

The type of weave in the first woven ballistic layer is not particularly limited. Exemplary weaves that can be used for woven layers include, without limitation, plain, twill, basket, satin, leno, mock leno, sateen and combinations thereof. In embodiments, three-dimensional weaves may be used. Double weaves, triple weaves, quadruple, quintuple, etc. to tredecuple weaves, and any type of offset weaves may also be used. In embodiments, different weaves of different denier are provided in the consolidated material to improve the interaction of the material with a projectile in a ballistic event. A similar advantage may be gained using a double weave, such as disclosed in US 2014/0065907, which is incorporated by reference.

Spunlace nonwovens may be made from lower denier materials than conventionally may be processed with a needlepunching loom. The spunlace nonwoven used in the ballistic material of the invention generally has a lower denier than the woven layer. In embodiments, the spunlace has a denier in a range of 0.5 d to 2.0 d. The spunlace nonwoven fibers may be ballistic grade and non-ballistic grade fibers. In embodiments, the spunlace nonwoven comprises ballistic grade fibers having a tenacity of at least 15 grams per denier (13.5 g/decitex) and a tensile modulus of at least 400 grams per denier (360 g/decitex). Such yarns may be selected from, without limitation, ballistic grade polyamide fibers, para aramid fibers, ultra-high molecular weight polyethylene (UHMWPE) fibers, polypropylene fibers, polyester fibers, poly(phenylene-2,6-benzobisoxazole) (PBO) fibers, graphene, spider silk, carbon nano-tubes, multi-component fibers or co-polymer fibers. The foregoing fibers includes fibers that have been modified, processed or treated. In embodiments according to the invention, spunlace nonwoven para-aramid and also spunlace polyethylene and polypropylene were used.

The hydroentangled nonwoven material may constitute 0.1 to 30% of the finished consolidated material, in embodiments 0.1 to 10% of the consolidated material.

A finished ballistic product may incorporate a plurality of Core Matrix® layers stitched together. Any type of stitching known in the art may be used, including, without limitation, a plain stitch, a quilt stitch and a cross stitch. In embodiments a finished ballistic product is prepared by attaching one or several Core Matrix® layers with a corner tack stitch or with a perimeter and a cross stitch. Preferably 2 to 50, and more preferably 2 to 5, core layers are combined in a finished product by stitching, or other forms of mechanical bonding. Various backing materials may be used. However, the details of layering and stitching and making a finished product may be left to the skill of the designer and manufacturer of finished ballistic products.

FIG. 1 shows a comparison of ballistic properties of products made with the hydroentangled nonwoven according to the invention, versus existing Core Matrix® products made with needle punched carded web. FIG. 1 shows percent improvement in V50 feet-per-second performance when the nonwoven carded web of a conventional Core Matrix® material is replaced with the hydro-entangled nonwoven material. The tests were performed on 8 samples of Core Matrix® of which 4 were made with the original design using a carded web and the other 4 were made with the hydroentangled nonwoven spunlace. In this comparison both samples were constructed using 7 layers of 850 denier 6H sateen weaves of para-aramid woven scrims with a single layer of nonwoven para-aramid material on the strike face of the Core Matrix®. The fibers used in the nonwoven portion of the build for both versions of Core Matrix® were 50 mm in length. The hydro-entangled fibers have a denier of 1.5, the carded needle punch web fibers have a denier of 2.5. The hydro-entangled nonwoven layer comprises 3% of the finished weight of the package whereas the needle punched carded web comprises 7% of the finished weight of the package. Thus, higher V50 is achieved when using less nonwoven material in the form of a hydro-entangled material compared to the original needle punched carded web.

Figure 2:
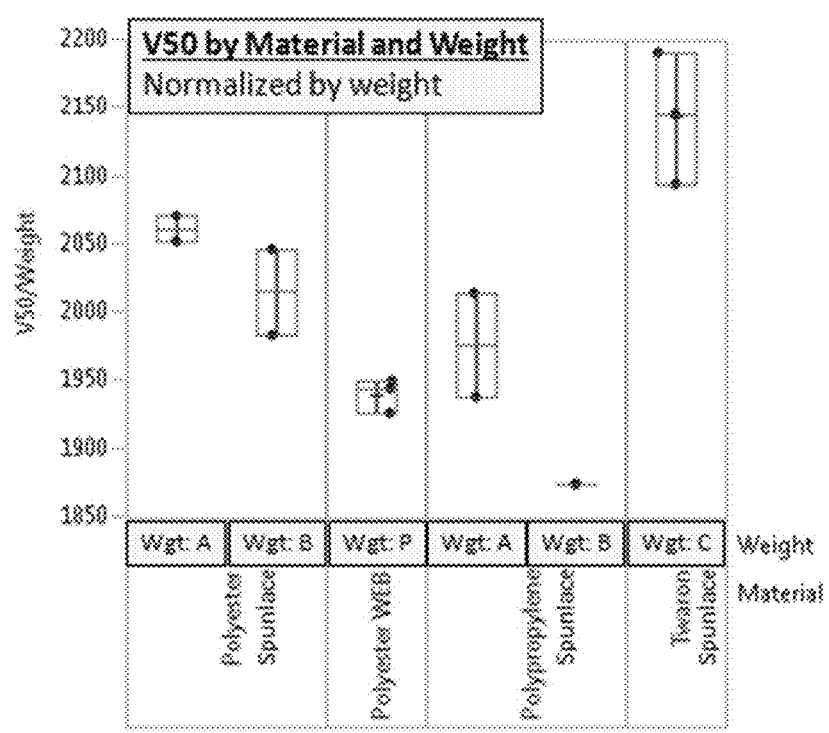
FIG. 2 shows normalized V-50 performance data for Core Matrix® ballistic fabrics in which the conventional polyester web of the Core Matrix® is substituted with other fibers.

FIG. 2 shows a comparison of the original Core Matrix® technology, using a nonwoven needle punched carded web of polyester staple fibers versus a modified Core Matrix® that replaces the polyester web with different nonwoven hydro-entangled staple fibers. All tests were done using 3 plies of Core Matrix® in each shoot pack. The Core Matrix® for every shoot pack consisted of 7 layers of woven para-aramid scrims with 750 denier yarns, 6H Sateen Weave and a single layer of non-woven material on the strike side. The raw V50 data were normalized by dividing by the weight of the shoot pack for each test. This was done to rule out the finished weight of the shoot pack as a factor on performance versus the influence of the materials being tested. Various weights of the tested hydro-entangled fibers were compared to the heavier polyester web used in the original Core Matrix®. This data shows that regardless of the weight of the hydro-entangled fibers used, the normalized V50 was higher when compared to the needle punched carded polyester web.

Figures 3A, 3B:
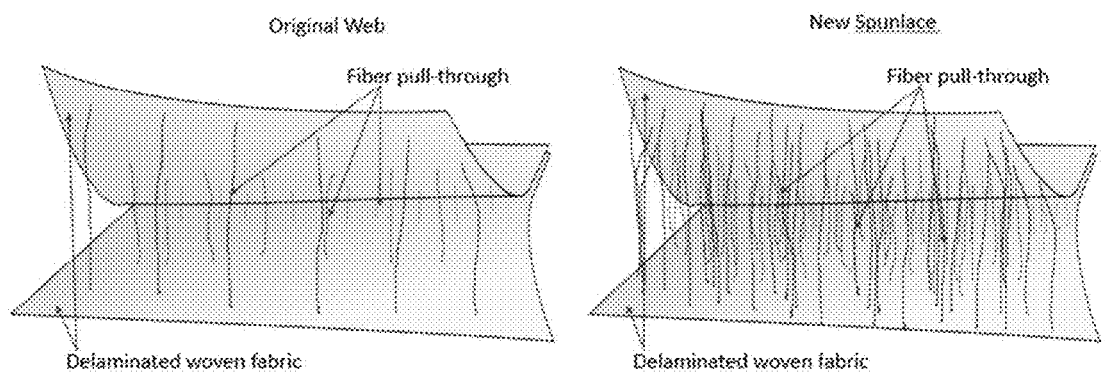
FIGS. 3A and 3B depict a ballistic material according to the prior art and according to the invention, respectively, showing improved integration of hydroentangled nonwoven in a finished material according to the invention.

FIG. 3B depicts the improved "push through" of the lower denier hydro-entangled nonwoven according to the invention, compared to the prior art material having comparable areal weight, shown in FIG. 3A.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A ballistic material, comprising:
   a first woven para-aramid ballistic fabric having a fiber denier in a range of 50 d to 5000 d; and
   a hydroentangled nonwoven fiber component consisting essentially of ballistic grade para aramid fibers having a denier in a range of about 0.5 d to about 2.5 d and a density of about 10 gsm to about 200 gsm; wherein
   the hydroentangled nonwoven component is needlepunched with the woven ballistic fabric to form a consolidated material.

2. The ballistic material according to claim 1, wherein the hydroentangled nonwoven component consists essentially of fibers having a denier in a range of about 0.5 d to about 2.0 d.

3. The ballistic material according to claim 1, wherein the ballistic material has a finished areal weight of about 0.1 to about 2.0 pounds per square foot.

4. The ballistic material according to claim 1, wherein the hydroentangled nonwoven component fibers are coated with a water repellent coating.

5. The ballistic material according to claim 1, comprising a plurality of woven ballistic fabric layers integrated with the hydroentangled nonwoven component.

6. The ballistic material according to claim 1, having an areal weight in a range of 0.1 to about 2.0 pounds per square foot and a V50 in a range of about 750 to about 3000 feet per second.

* * * * *